March 18, 1941.    C. M. YODER    2,234,999
APPARATUS FOR FORMING SECTIONS OF SHAPED SHEET MATERIAL
Filed July 25, 1938    5 Sheets-Sheet 1

INVENTOR.
Carl M. Yoder.
By
Geo. B. Pitts
ATTORNEY.

March 18, 1941. C. M. YODER 2,234,999
APPARATUS FOR FORMING SECTIONS OF SHAPED SHEET MATERIAL
Filed July 25, 1938 5 Sheets-Sheet 5

INVENTOR.
Curl M. Yoder.
BY
ATTORNEY.

Patented Mar. 18, 1941

2,234,999

UNITED STATES PATENT OFFICE 2,234,999

APPARATUS FOR FORMING SECTIONS OF SHAPED SHEET MATERIAL

Carl M. Yoder, Lakewood, Ohio

Application July 25, 1938, Serial No. 221,126

14 Claims. (Cl. 164—87)

This invention relates to an apparatus for and process of forming sheet material into predetermined cross sectional shapes and cutting the material into predetermined lengths ready for assembly or fabrication. The invention is particularly adapted for making shaped sections of material wherein because of the thinness of the stock and/or its cross sectional shape the material cannot be cut into lengths according to present methods and apparatus.

One object of the invention is to provide an improved apparatus for shaping sheet material and cutting it into predetermined lengths without waste of material.

Another object of the invention is to provide an improved process of shaping sheet material and cutting it into predetermined lengths, whereby the material may be of any predetermined cross sectional shape and cut into uniform lengths.

Another object of the invention is to provide an improved apparatus of this character for forming sheet material into predetermined cross sectional shape, and having a preliminary cutting mechanism and a final cutting mechanism, co-operating to cut the material into lengths the ends of which are ready for assembly or fabrication.

Other objects of the invention will be apparent to those skilled in the art to which my invention relates from the following description taken in connection with the accompanying drawings, wherein—

Figures 11B, 15, 16:
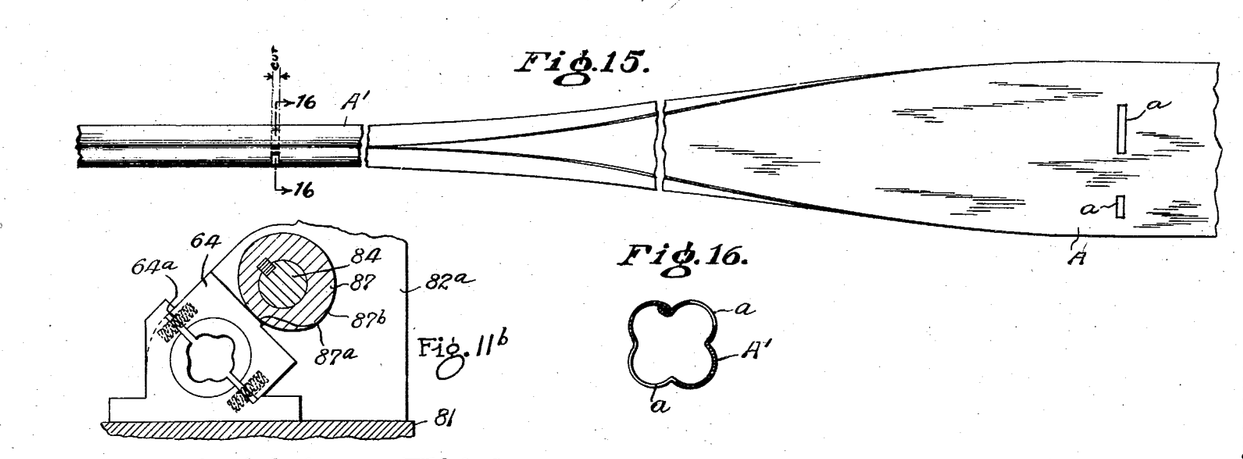
Fig. 11b is a fragmentary sectional view substantially similar to Fig. 11a, enlarged.
Fig. 15 is a view illustrating the delivery of the material, preliminarily cutting it, shaping the material and severing it into lengths.
Fig. 16 is a section on the line 16—16 of Fig. 15.

In carrying out my process, the sheet material of the desired thickness is continuously supplied from a suitable source, such as a coil. The first step consists in subjecting the material to a preliminary cutting operation transversely thereof as it feeds forwardly, at predetermined spaced points longitudinally of the material, whereby a portion of the material is cut or severed. The preliminary cutting operation may effect a transverse cut or cuts between its side edges, as shown in Fig. 15, a cut extending inwardly from one or both side edges of the material or a cut extending inwardly from either or both edges and a cut between its side edges, as shown in Fig. 17, thereby leaving in either arrangement unsevered portions of the material, the position and arrangement of the cut or cuts being dependent upon the cross sectional shape to be given to the material.

Figures 17, 18, 19, 20:
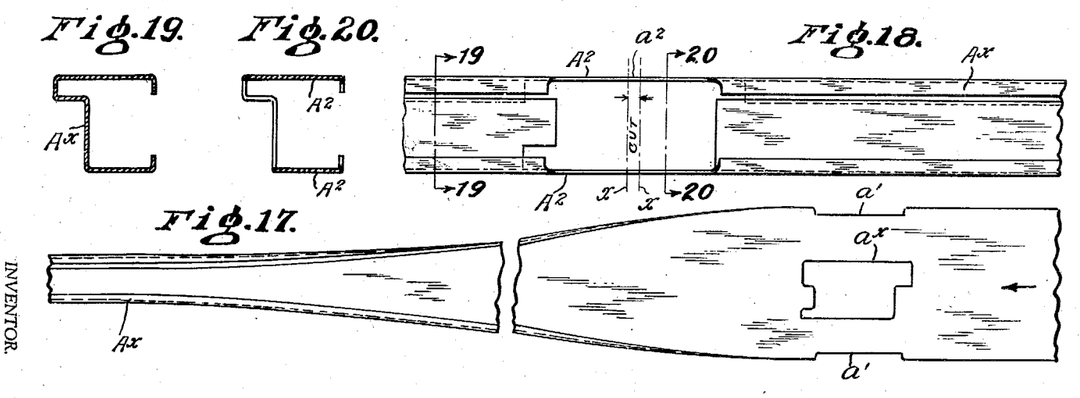
Figs. 17 and 18 (the latter being enlarged) illustrate the delivery of the material cutting on its side edges and blanking out an opening therein, shaping the material into an irregular cross sectional shape and severing it into lengths.
Figs. 19 and 20 are sections on the lines 19—19 and 20—20, respectively, of Fig. 18.

In the preferred method, this step consists in stamping out one or more intermediate portions of the material to form in predetermined spaced relation openings the walls of which co-operate with those walls formed by the final cutting mechanism to provide each section with ends disposed at right angles to the shaped material, but, as shown in Figs. 17 and 18, the preliminary cutting mechanism and the final cutting mechanism may co-operate to provide the ends of each section with predetermined shaped end walls having members that may be utilized in the assembly of the sections when fabricated in final position of use.

Next, the material A is fed to a suitable shaping mechanism having sets of rolls or passes which bend the material along longitudinal lines to provide the desired cross sectional shape.

Next, the remaining or unsevered portion of the material is cut, thereby completing the section and by preference giving final shape to the end of the completed section and adjoining end of the succeeding section, so that waste of material between succeeding sections (except for the width of the cutting device) is avoided. It will be noted that the cutting devices for making each preliminary and final cut may be arranged so that the opposite ends of each section are similar or of different shape dependent upon the assembly of the section in final position of use.

In the drawings, 1 indicates as an entirety the preliminary cutting mechanism, 2 indicates as an entirety the shaping mechanism and 3 indicates as an entirety the final cutting mechanism. These mechanisms may be mounted on a single base or support, but for convenience of manufacture, assembly of each and positioning, they are mounted on separate bases 1a, 2a, 3a, respectively.

The base 1a is provided with spaced standards 1b having suitable bearings to support a shaft 4, carrying a cam 5 to which reference will later be made. At one end the shaft 4 rotatably mounts a fly-wheel 5' which is continuously driven by a belt 5a from a pulley 6 on the shaft of a motor 6a. Between the fly-wheel 5 and shaft 4 is a suitable clutch for connecting the shaft to the fly-wheel, so that by means of control elements (later referred to) the shaft is driven and stopped at the end of one revolution thereof, the effect of which is to operate the preliminary cutting devices, a down stroke and an up-stroke thereof. The standards 1b are provided with upwardly disposed hollow extensions 7 forming guides for slidable rods 8 carrying at their upper ends a cross head 9 and rigidly connected at their lower ends to a yoke 10 the sides of which are formed with elongated openings to accommodate the shaft 4 and permit the yoke to reciprocate up and down. The lower end of the yoke 10 is provided with a depending pin 11, which extends through and is guided by the walls of a bushed collar 12 suitably seated in the top wall of the base 1a. Between the flange of the collar 12 and lower end of the yoke 10 and surrounding the pin 11 is an expansion spring 13, which normally tends to bias the yoke 10 upwardly and through it to move the cross head 9 upwardly. Within and adjacent the lower end of the yoke 10 I mount a shaft 14 on which is loosely mounted a roller 14a in engagement with the cam 5, the throw of which serves to move the yoke 10 and cross head downwardly in opposition to the spring 13. The cross head 9 is provided with a depending block 16 between which and a plate 17 provided on the upper ends of the standards 1b, are slidably mounted the die and support for the preliminary cutter. At its forward end the plate 17 is provided with brackets 18 to which springs 19 are anchored at one end, their opposite ends being connected to the support for the die and normally tending to move it and the cutter rearwardly against a stop 20, so that when the die and cutter are moved forwardly with the material A and released therefrom, as later set forth, they will be automatically returned to their normal position against the stop 20. At its rear end the plate 17 is provided with a bracket 17a which and a bracket 2b on the base 2a support a table 21 over which the material A moves in feeding from the preliminary cutting mechanism 1 to the shaping mechanism 2, the table 21 having a length to provide for maximum adjustment of the element which is mounted thereon and controls the operation of the clutch to effect operation of the cutter.

Figure 12:
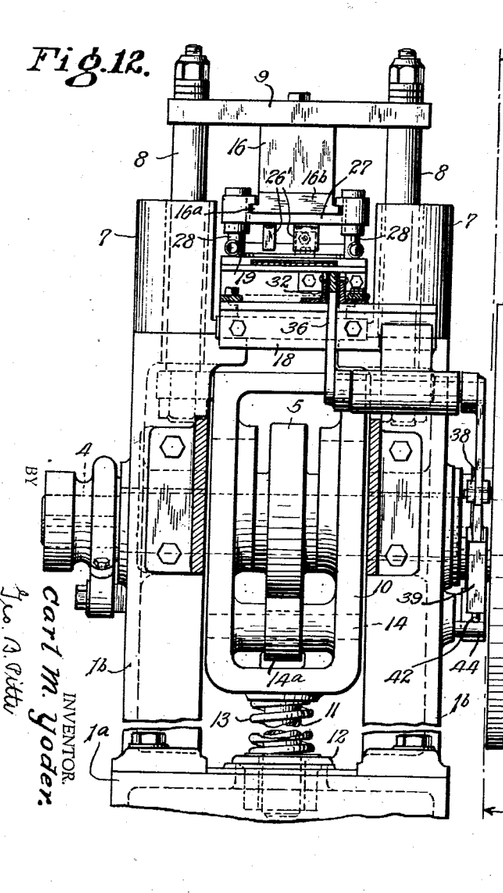
Fig. 12 is a section on the line 12—12 of Figs. 4 and 13, enlarged.

The die preferably consists of spaced blocks 22, 23, slidably engaging ways 17b on the plate 17 and provided with cross members 24 which are connected together by a plate 25, the members 24 being spaced from the blocks 22, 23, to provide openings through which the material A is guided. The block 23 carries a die element 26 which co-acts with the cutter 26' (two cutters being shown—see Fig. 12—to stamp out two portions of the material as shown at a in Fig. 15) mounted on a cross support 27. The support 27 is provided at opposite ends with ways which slidably engage flanges 16a on a plate 16b secured to the block 16. The support 27 is provided with pilot pins 28 which slidably fit openings in the lateral portions of the block 23 so as to maintain the support 27 in operative relation to the block during reciprocation thereof.

Figure 13:
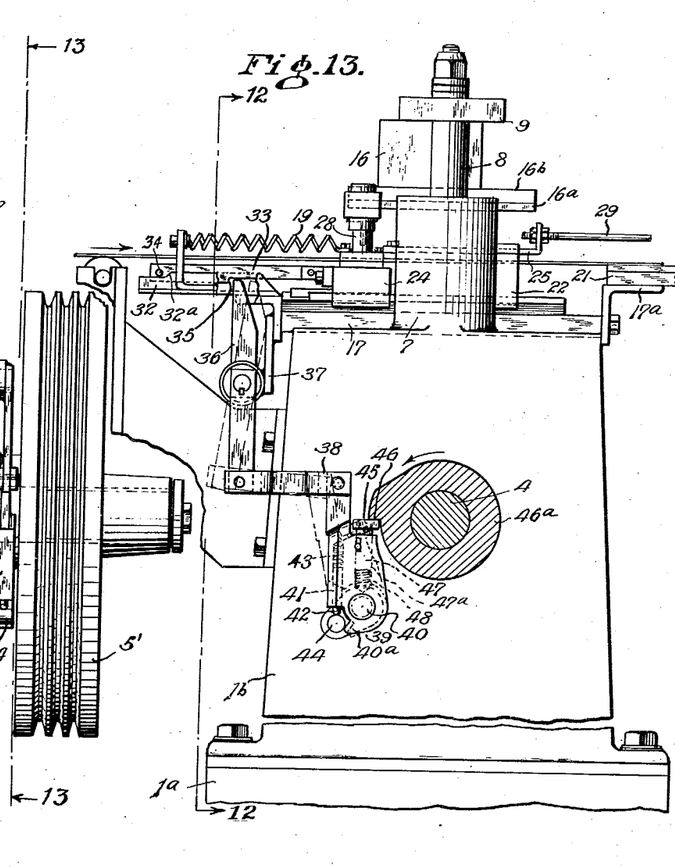
Fig. 13 is a section on the line 13—13 of Fig. 12.

The operation of the cross head 9 is controlled by the spaced openings in the material formed by one of the preliminary cutters 26'; that is, each opening controls the operation for effecting the succeeding cut. For this purpose I secure to the plate 25 a rod 29 to which is adjustably secured a block 30 and the latter in turn carries a pivoted dog 31, the nose 31a of which is arranged to drop into the opening in the material A formed by one of the preliminary cutters 26' and through the engagement of the wall of the opening with the dog 31, the material moves the dog with it. As the dog 31 is connected to the rod 29, the latter moves the die and cutters therewith and such movement effects operation of the clutch to reciprocate the cutters by means of the following devices; 32 indicates a pair of spaced arms fixed to the brackets 18 and provided adjacent their outer ends with inclined walls 32a. 33 indicates a release member pivotally connected at its inner end to the block 23 and disposed between the arms 32 and carrying at its outer end laterally projecting pins 34 arranged to engage the inclined walls 32a and swing the release member upwardly as it moves forwardly with the block 23. On its lower side, the release member 33 is provided with a shoulder 35 arranged to engage and swing a lever 36 suitably fulcrumed on a depending bracket 37, when the die support is moved forwardly, as already set forth. In such movement, the release member 33 moves forwardly to operate the lever 36 and is then disengaged from the lever by the engagement of the pins 34 with the inclined walls 32a, which swing the release member upwardly, and permit the release member to swing downwardly into operative position, with the shoulder 35 behind the lever 36 when the die support is returned or moved rearwardly by the springs 19. The other end of the lever 36 is pivoted to one end of an arm 38, and the opposite end of the arm 38 is pivotally connected to one end of a trip device, indicated as an entirety at 39, mounted to rock on a stud shaft 40. The trip device 39 is formed with a recess 41 in which is slidably mounted a plunger 42, an expansion spring 43 being interposed between the inner end of the plunger and the bottom of the recess and normally tending to project the plunger outwardly. As shown, the plunger 42 is disposed in engagement with a stationary pin or abutment 44, so that the tension of the spring serves to swing the device 39 about the shaft 40, clockwise as viewed in Fig. 13, such movement being limited by the engagement of a projection 40a on the device with the abutment 44, as shown. The clockwise movement of the trip device 39, through the arm 38, serves to return the lever 36 to its normal position, which is predetermined by reason of the engagement of the projection 40a with the abutment 44, so as to be operatively related to the shoulder 35 when the release member is returned to its rearmost or normal position. The trip device 39 is provided with a shoulder 45, which—when the lever 36, arm 38 and trip device are in their normal positions as shown in Fig. 13—lies in the path of movement of the dog 46 on a collar 46a. The collar 46a is connected to that element of the one revolution clutch which controls the connection with and disconnection of the clutch from the shaft 4. As will be understood, when the dog 46 is in engagement with the shoulder 45, the clutch is ineffective and disconnected from the shaft 4, but upon movement of the shoulder 45 to the position shown in dotted lines in Fig. 13, due to operation of the lever 36, the collar 46a will be released and thus effect operation of the clutch to rotate the shaft 4. As the lever 36 is released from the shoulder 35 of the release member 33 in co-ordinated relation to and immediately following the disengagement of the shoulder 45 from the dog 46, and is then returned to its normal or predetermined position under the influence of the spring 43, it will be seen that the shoulder 45 is repositioned in the path of movement of the dog 46 to arrest rotation of the collar 46a at the end of one revolution thereof, so that the clutch is released from the shaft 4 when the latter has made one revolution. The shoulder 45 is preferably mounted on a plunger 47 which slidably fits a recess 47a formed in the walls of the device 39, an expansion spring 48 being interposed between the inner end of the plunger 47 and the bottom of the recess 47a and normally tending to slide the plunger outwardly, this arrangement serving as a cushion to absorb the blow incident to the engagement of the dog 46 with the shoulder 45. The plunger 47 is provided with a pin 49 which slides in a slot formed in the walls of the device 39, the end walls of the slot serving to limit the movement of the plunger 47 in either direction.

50 indicates a block mounted on the table 21 intermediate the ends of the dog 31, being secured thereto by bolts 50a engaging a clamp plate 51 on the lower side of the table. The block is recessed at 52 to accommodate shoes 53, over which the sheet metal material A slides, and the dog 31, and is provided on its bottom wall with a plate 54 which is interposed between the material and the dog 31 and extends forwardly from the block 50, but terminates at a point spaced rearwardly from the nose 31a of the dog 31. The free end of the plate 54 is inclined to form a cam wall 55, with which the nose 31a of the dog 31 engages as it moves forwardly, to swing the dog upwardly and thus disengage it from the material A. The block 50 is adjustable on the table 21 to permit the cam wall 55 to be positioned in spaced operative relation to the nose 31a of the dog so as to disengage it from the material A after the dog 31, operating through the rod 29, has moved the release member 33 a sufficient distance to effect operation of the one revolution clutch, as already described. The block 50 is formed with an opening 56, the walls of which form a guide for the rod 29. A bolt 57 is mounted in the block 50 and carries on its front end a suitable clip 58 to which is secured one end of a leaf spring 59, the free of the latter being in engagement with the dog 31 and normally tending to swing it downwardly and thus cause it to successively enter one of the openings in the material as the latter is drawn forwardly. The rod 29 may have a length substantially equal to the length of the table 21 to permit the adjustment of the blocks 30 and 50 therealong to position the nose 31a of the dog 31 and cam 55 any predetermined distance from the cutters 26', it being understood that the distance of the nose 31a from the cutters 26' determines the longitudinal spacing of the openings $a$ formed by the cutters.

The table 21 may be provided with a plurality of guides 60, each adjustably secured to the table and arranged between the block 50 and outer end of the table, each guide 60 being formed with an opening 60a alined with the opening 56 in the block 50 to slidably support the outer end portion of the rod 29 and guide it when moved.

The shaping mechanism 2 consists of a plurality of sets of shaping rolls 2c removably secured to shafts 2d, which are suitably mounted in standards on the base 2a and driven by gearing within housings 61. By preference, the driving of the rolls 2c is utilized to feed the material A through the preliminary cutting mechanism 1, whereby the material, when engaged with the dog 31 operates the cutters 26' and moves the die and cutters with the material while the latter are operating.

Figure 1:
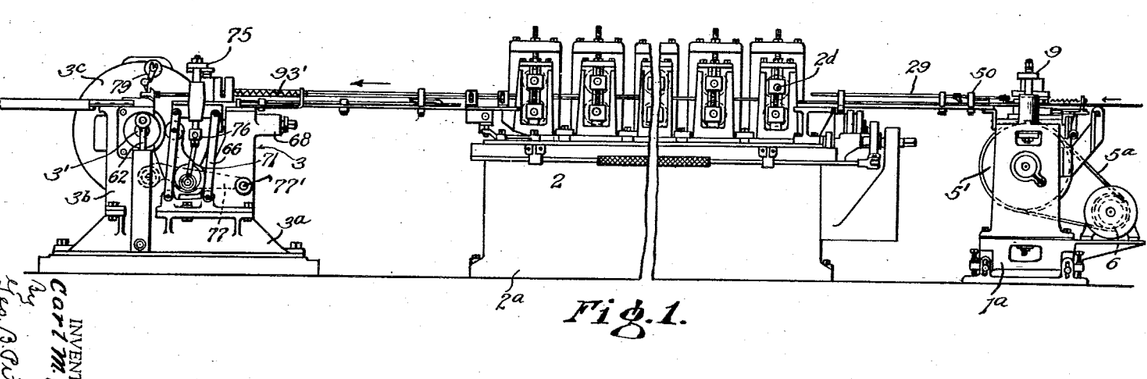
Fig. 1 is a side elevation of an apparatus embodying my invention.
Figure 2:
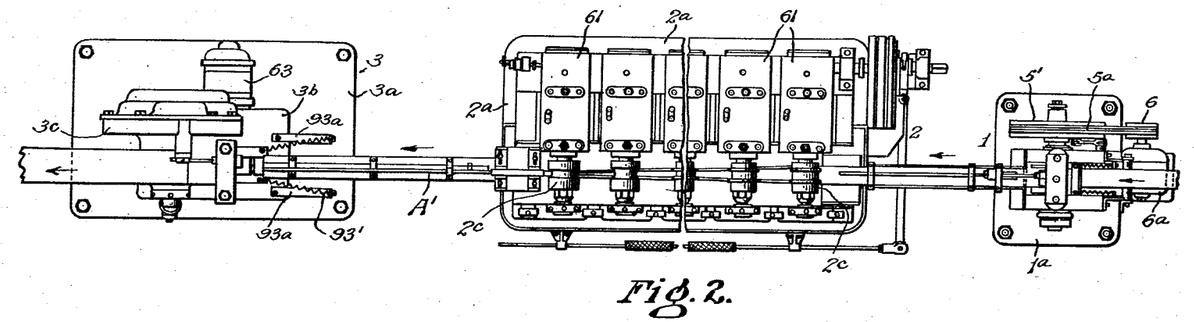
Fig. 2 is a plan view.
Figures 3, 4, 5, 6:
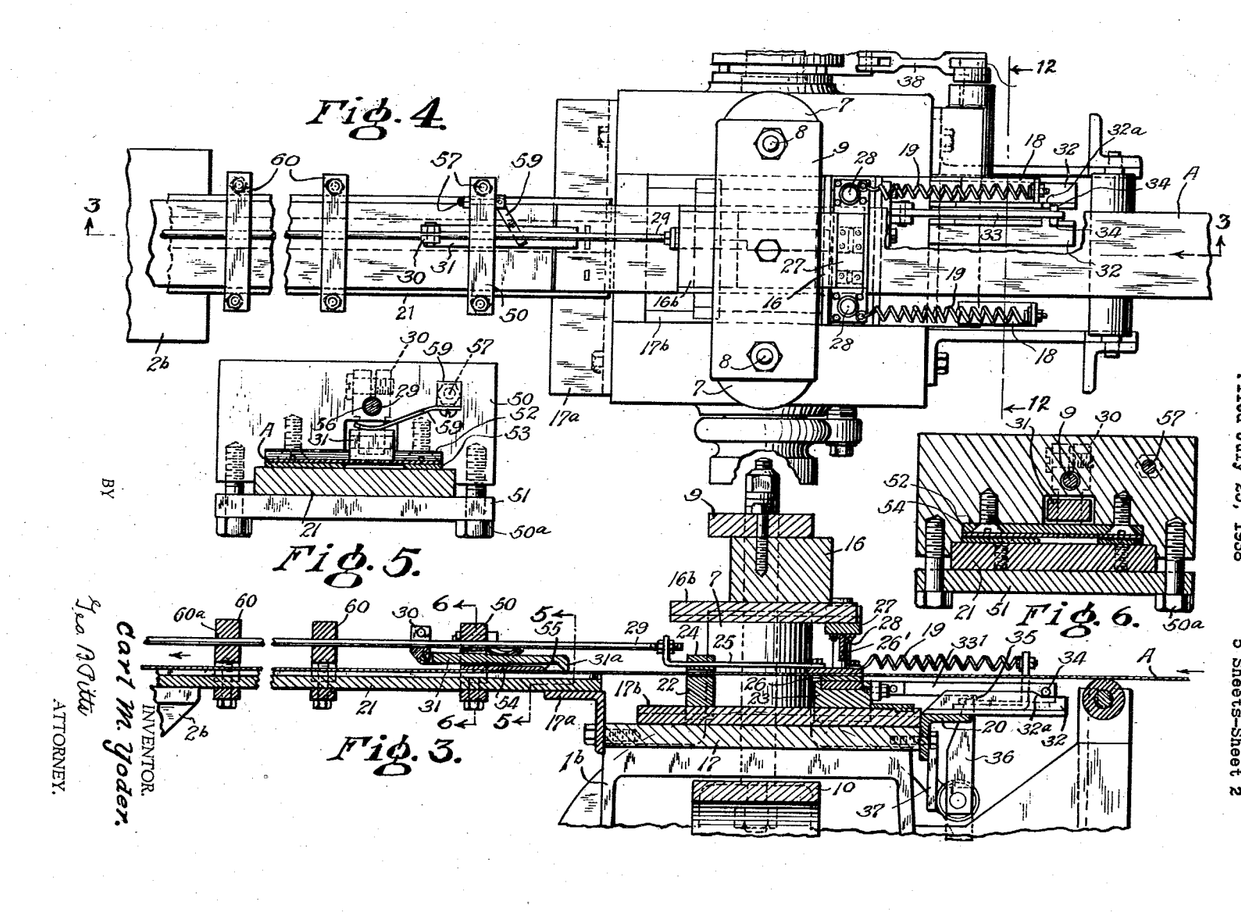
Fig. 3 is a fragmentary section on the line 3—3 of Fig. 4, enlarged, illustrating the preliminary cutting mechanism.
Fig. 4 is a plan view of the parts shown in Fig. 3.
Figs. 5 and 6 are sections on the line 5—5 and 6—6, respectively, of Fig. 3, enlarged.
Figures 7, 8, 9, 10, 11, 11A, 14:
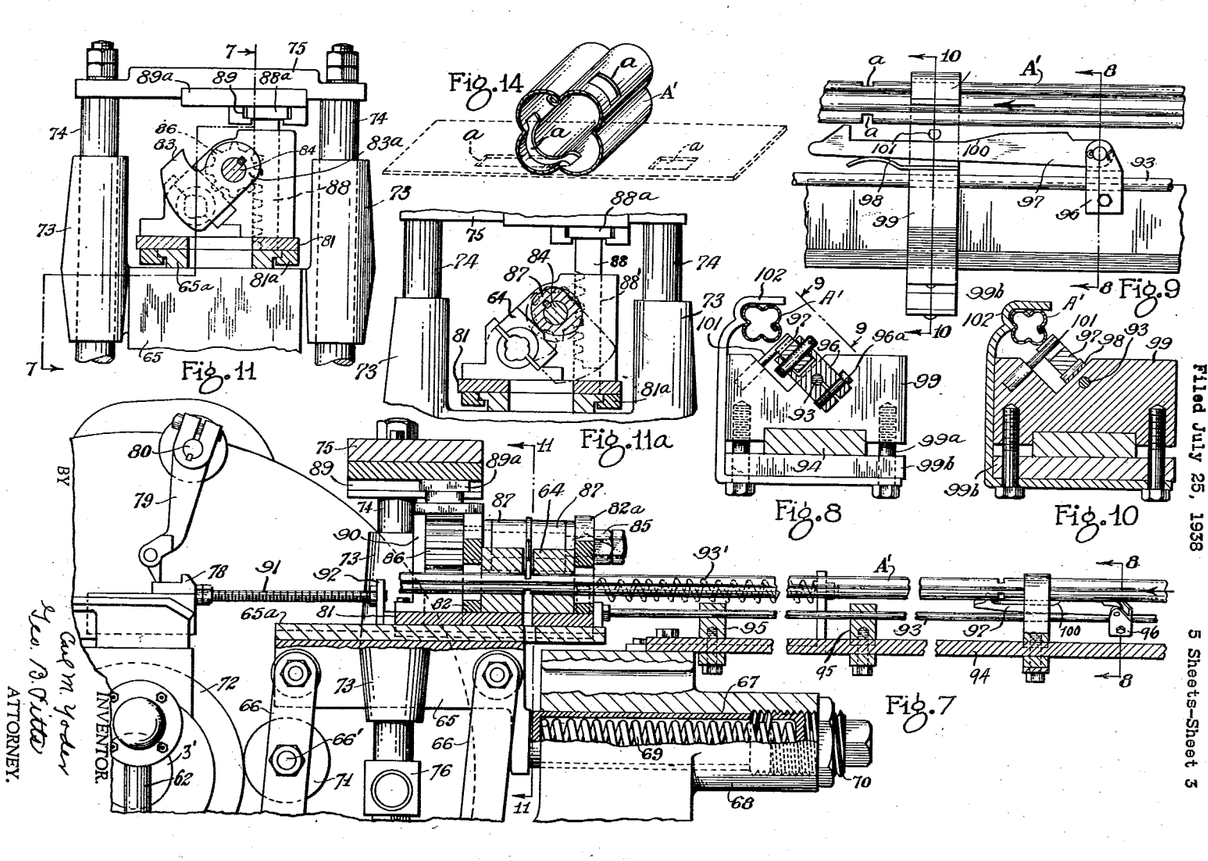
Fig. 7 is a fragmentary view, partly in section, of the final cutting mechanism, substantially on the line 7—7 of Fig. 11.
Fig. 8 is a section on the line 8—8 of Figs. 7 and 9.
Fig. 9 is a view of the parts shown in Fig. 8, on the line 9—9 thereof, enlarged.
Fig. 10 is a section on the line 10—10 of Fig. 9.
Fig. 11 is a fragmentary section on the line 11—11 of Fig. 7.
Fig. 11a is a fragmentary section on the line 11a—11a of Fig. 7.
Fig. 14 is a perspective view of one end of a section of sheet material showing in dotted lines the steps of preliminary cutting the material and in full lines the shaped material.

The rolls 2c shown in Figs. 1 and 2 may be of any desired contour so as to bend the material A into the desired cross sectional shape and for this purpose the shaping mechanism 2 may consist of any desired number of sets of rolls 2c. For purposes of illustration, the material A may be blanked out at $a, a$, and then shaped to form a tube A' of clover leaf shape in cross section, as shown in Figs. 14 and 15. In Fig. 14 the tube A' is shown rotated one-half revolution as compared to the position of the tube in Figs. 8, 9 and 10, so as to clearly show the openings $a, a$. Figs. 17, 18, 19 and 20 (Figs. 18, 19 and 20 being enlarged) illustrate the forming of the material into a different cross sectional shape $A^x$, wherein preliminary cutters are arranged to cut the material at $a', a'$ and blank out an opening $a^x$. The material is then shaped as shown in Figs. 18, 19 and 20 and when the final cutting or severing mechanism cuts the material at $a^2$ between the lines $x, x$, the ends of the sections are provided with extensions $A^2$ which serve as elements to secure the sections in position in a fabricated structure. It will thus be seen that the preliminary and final cutting devices may be arranged to provide squared-off ends on the sections (Figs. 14, 15 and 16) or to shape the ends (Figs. 18 and 20) so that they may be related to other structural members when mounted in final position.

The final cutting or severing mechanism 3 consists of a shaft 3' suitably mounted in the walls of a frame 3b, which is secured to the base 3a. The shaft 3' is arranged to be locked in a predetermined position and connected through cranks to pitmans (one being shown at 62) each connected to a spring (not shown) under compression so as to impart rotation to the shaft when released by its locking element. The rotation of the shaft by the springs serves to throw in a clutch between a power element (fly-wheel within the casing 3c) which is continuously driven by a motor 63, and the shaft, to supplement the power of the springs and rotate the shaft one complete revolution, at which time the clutch is thrown out, the springs are re-set and the locking element operates to arrest and lock the shaft against rotation. The tube A' passes through a die 64 mounted, as hereinafter set forth, on a support 65. The support 65 is mounted on pairs of parallel links 66 suitably pivoted on the frame 3b to permit the support to be reciprocated, whereby it moves in one direction with the tube A' during cutting thereof. The support 65 is moved with the tube by a plunger 67 slidably mounted in a barrel 68, the plunger 67 being hollow to accommodate an expansion spring 69 which is interposed between an adjustable plug 70 threaded into the outer end of the barrel and the end wall of the plunger and serves normally to bias the plunger 67 toward the left as viewed in Fig. 7. One of the links 66 is provided with a stud shaft 66' on which is loosely mounted a roller 71. The roller is held in engagement with a cam 72 fixed to the shaft 3', by the spring 69, the cam being shaped to control the movement of the support 65 with the tube A' and to move the support in the opposite direction in co-ordinated relation to the movement of the cutter, to which reference will later be made. The support 65 is provided at opposite sides with tubular members 73 through which slidably extend rods 74 carrying a cross head 75 at their upper ends. The lower ends of the rods 74 are connected together by a cross bar 76, which, through linkage 77, fulcrumed on the frame 3b at 77' and connected to the adjacent pitman 62, is reciprocated in each revolution of the shaft 3', the bar 76 in turn, through the rods 74, reciprocating the cross head 75, to effect the cutting operation as later set forth. The release of the shaft 3' for rotation by the power springs and power element driven by the motor 63 is controlled by the tube A' in its forward movement, as later set forth, by means of a thrust member 78 engaging with and swinging a dog 79, which is fixed to a rock shaft 80. The parts of the mechanism 3 so far described and the lock and release means between the rock shaft 80 and driven shaft 3' correspond to like parts shown, described and claimed in the application of Alexander Borzym, Serial No. 150,697, to which reference may be made, and for this reason such parts are briefly described and illustrated and no claim thereto is made herein.

The die 64 is mounted on a base plate 81 between standards 82, 82a, suitably secured to the latter. The base plate 81 is provided on its lower side with strips 81a which engage flanges on a plate 65a fixed to the support 65 to permit the base plate 81 and standards 82, 82a, to move relative to the support 65. The die 64 consists of two lower elements suitably fixed to the base plate 81 and two upper elements normally held in spaced relation to the lower elements by sets of expansion springs 64a so as to permit the tube A' to readily slide through the die, but are moved into engagement with the lower die elements prior to and in co-ordinated relation to the operation of the cutting element, as later set forth. As shown in Fig. 7, the lower die elements and the upper die elements are respectively spaced to accommodate a cutting element 83, the opposed walls of the die elements serving as the shearing edge to co-act with the cutting element to cut the tube A' between the lines x', x' (Fig. 15). The cutting element 83 is provided with a laterally extended portion 83a, which is fixed to a shaft 84. The shaft 84 is mounted to rotate in the standards 82, 82a, and when rotated (as later set forth) in one direction the cutting element 83 operates to cut the tube as above set forth. The shaft 84 is held against endwise movement by nuts 85 on one end thereof, engaging the outer side of the standard 82a and a pinion 86, which is keyed to the shaft, engaging the outer side of the standard 82. At either side of the cutting element and between it and the adjacent standard, I provide a cam 87 which is fixed to and surrounds the shaft 84. As shown in Figs. 11a and 11b, when the cutting element 83 is in normal or inactive position, the low or relief side 87a of the cam 87 permits the upper die elements to move upwardly away from the lower die elements, but upon rotation of the shaft 84, the cam wall 87b serves to move the upper die elements into engagement with the lower die elements (see Fig. 11) prior to the engagement of the cutting element 83 with the walls of the tube A', the effect of which is to clamp the die elements to the latter. The cutting element 83 is oscillated by rocking the shaft 84, which movement is effected by means of a rack 88 carried by and movable with the cross head 75. The upper end of the rack 88 is provided with a head 88a the lateral sides of which slidably fit ways 89, the ways 89 being provided on a plate 89a fixed to the cross head 75. The rack 88 slidably fits an elongated recess 88' formed in a block 90 which is fixed to the base plate 81, the side walls of the recess serving to move the rack in the ways 89 with the base plate 81 and parts mounted thereon. As shown in Fig. 7, the thrust member 78 is adjustably connected by a rod 91 to a bracket 92 fixed to the front end of the base plate 81 and the rear end of the latter has connected to it a thrust rod 93 adapted to be connected to the tube A', whereby the endwise movement of the latter moves the thrust element 78 which in turn engages with and operates the arm 79; the arm in turn, through the rock shaft 80 controlling the operation of the shaft 3' and through the linkage 77 to reciprocate the cross head 75. The base plate 81 is connected to corresponding ends of springs 93', the opposite ends of which are connected to brackets 93a carried by the frame 3b (see Fig. 2). The springs 93' are put under tension when the base plate 81 is moved forward by the tube A' and operate to return the plate to normal position after the arm 79 has been operated and after the tube A' has been disconnected from the rod 93.

94 indicates a table supported at its opposite ends on the base 2a and frame 3b and provided with spaced blocks 95 formed with alined openings 95a through which the rod 93 is guided. 96 indicates a supporting device adjustably secured to the rod 93 and provided with spaced lugs between which is pivoted a dog 97. The body portion of the supporting device 96 is split (see Fig. 8) to permit a bolt 96a to clamp the device to the rod 93, whereby the supporting device may be adjusted both longitudinally and angularly of the rod, dependent upon the spacing of the slots a, a, and the position thereof in the wall of the tube A'. The nose 97a of the dog is arranged to drop into each of the openings a, whereby the rear wall of the opening will engage the nose 97a and thus connect the tube A' to the dog 97 and through the latter connect the tube to the rod 93, so that the latter is moved forwardly endwise to operate the thrust element 78. The dog 97 is normally biased into engagement with the tube A' and hence caused to enter the successive openings a, by a leaf spring 98 suitably supported on a transversely arranged block 99, which is removably and adjustably secured to the table 94 by bolts 99a extending through a clamping plate 99b, between the supporting device 96 and the outer end of the dog 97. Between the block 99 and the pivoted end of the dog 97, the latter is provided with an upwardly and rearwardly inclined wall 100 forming a cam. The cam 100, in the forward movement of the dog with the tube A', as above set forth, engages a pin 101, the effect of which is to release the dog 97 from the wall of the adjacent opening a and permit the dog, rod 93, die and cutter, rod 91 and thrust member 78 to return to normal position under the influence of the springs 93', ready for the succeeding cutting operation. To guide the tube A' and prevent springing thereof laterally when engaged by the dog 97 and during movement of the latter and parts connected thereto by the tube, I provide a bracket 102 the outer end portion of which is disposed on the opposite side of the tube A' from the dog 97 and is engaged by the tube as it moves forward. The bracket 102 is preferably secured to the clamping plate 99b by the bolts 99a and is therefore adjustable therewith.

*Operation.*—The material A is first blanked out, manually or otherwise, to form the first opening a therein at a substantial distance from its starting end so that a portion of the material may be extended between the preliminary die and cutters therefor and positioned between one or more sets of shaping rolls, whereby the latter, when driven, may operate to draw the material through the preliminary cutting mechanism 1, shape the material and feed the latter to the final cutting mechanism. With the motor 63 and driving means for the shaping mechanism set in operation, the material A is drawn through the preliminary cutting mechanism 1 until the wall of the first opening is engaged by the dog 31. By reason of the movement of the material, the wall of this opening will, through the dog 31 move the preliminary cutting elements (die and cutters) with the material and simultaneously operate the one revolution clutch to rotate the shaft 4 and reciprocate the head 9, whereby the cutters 26' will be operated to blank out openings a during their movement with the material, following which the cutting elements will be moved to normal position and the shaft 4 will be disengaged from the clutch and stopped. As the material is being drawn forward by the shaping mechanism the wall of one of the openings formed by the cutters 26' will engage with and move the dog 31 and through it, again move the cutting elements (die and cutters) with the material, and effect another operation of the cutters, as above set forth, to blank out the succeeding openings a in the material. It will thus be seen that each operation of the preliminary cutters 26' is effected by the engagement of the wall of one previously blanked out opening with the dog 31. The material then passes to and through the shaping mechanism 2, which shapes it and feeds the shaped tube A' to the final cutting mechanism 3. In such movement, the wall of each succeeding opening a (referring to one of the openings formed in each operation of the cutters 26') engages the dog 97 and effects movement of the final cutting die and co-acting cutting element with the tube A' and simultaneously effects operation of the cutting element to cut the material into predetermined uniform lengths. From the foregoing description it will be noted that the material is continuously supplied and moved or fed by the driving of the shaping rolls; that the material automatically operates each cutting mechanism, each spaced opening formed in the material serving to control the preliminary cutting mechanism and the final cutting mechanism. It will also be noted that since the material is partially severed or cut while in a flat condition, the shape of the preliminary cut may be changed or modified so that when the shaped material is severed into lengths, either or both ends of each length may be finished or completed in various ways ready to fit into or be assembled in pre-arranged fabricated position, whereby waste of material and extra expense is eliminated.

To those skilled in the art to which my invention relates many changes in construction and widely differing embodiments and applications of the invention will suggest themselves without departing from the spirit and scope of the invention. My disclosures and the description herein are purely illustrative and are not intended to be in any sense limiting.

What I claim is:

1. In a machine of the class described, the combination with a support, of a member mounted to reciprocate on said support, a die slidable on said support, a cutter slidable on said member and connected to said die for movement therewith, means for continuously feeding material between said die and cutter, power means, a clutch having an element driven by said power means, connections between another element of said clutch and said member for reciprocating the latter when said clutch elements are engaged one with the other, and means for controlling the operation of said last mentioned clutch element, said means comprising a dog arranged to engage a wall of the material formed by said cutter and move therewith, connections between said dog and said die and said control means for moving the die and cutter with the material and simultaneously operating said control means, and means for disengaging the dog from the wall of the material.

2. In apparatus of the class described, the combination with means for supplying and feeding sheet material of indefinite length and a support, of a reciprocatable cross head on said support, means for reciprocating said head, a die slidable on said support, a cutter slidable on said cross head and connected to said die for movement therewith and arranged to co-act with the die to cut the material, a rod connected to said die and extending therefrom substantially parallel to the material, a dog pivotally mounted on said rod and arranged to be engaged by the wall formed by each cut, whereby said rod and die are moved with the material, power means, and means actuated by the movement of die for connecting said reciprocating means to said power means.

3. An apparatus as claimed in claim 2 wherein means independent of said power means are arranged to return said die and cutter rod and dog to starting position after the dog disengages the wall of the material.

4. In apparatus of the class described, the combination with means for supplying and feeding sheet metal material, of a support, a cross head mounted to reciprocate on said support, means for reciprocating the cross head, a die couple operatively related for movement as a unit and slidably supported on said support and cross head, and arranged to cut the material in each operation of the cross head, a rod connected to one element of said die couple and extending therefrom substantially parallel to the material, a dog pivotally mounted on said rod and arranged to be engaged by a wall formed by each cut of the material, whereby the die couple is moved with the material, power means, means operated by the movement of the die couple with the material for connecting the power means to said reciprocating means, and a cam on said support arranged to disengage the dog from the material after the material has been cut by said die couple.

5. An apparatus as claimed in claim 4 wherein said dog is adjustable longitudinally of said rod and said cam is adjustable on said support independently of said dog.

6. In apparatus of the class described, the combination with means for supplying and feeding sheet material and a support, of a slide mounted to reciprocate horizontally on said support, a cross head mounted to reciprocate vertically on said support, means for reciprocating said cross head, a die couple operatively related for movement as a unit, one element of said couple being mounted on said slide and the other element thereof being slidably connected to said cross head, power means, and means, including an element arranged to be engaged and moved by a wall cut by said die couple, for simultaneously moving said slide and connecting said power means to said reciprocating means.

7. In a machine of the class described, the combination with supporting means and means for continuously supplying and feeding sheet material, of a mechanism on said supporting means for cutting a portion of the material during movement thereof, power means for operating said mechanism, said power means being normally disconnected from said mechanism, devices for connecting said power means to said mechanism and automatically disconnecting said mechanism therefrom after each operation of said mechanism, and means for operating said devices to connect said power means to said mechanism, the last said means comprising an element normally disposed in the path of movement of a wall formed by the cutting element of said mechanism.

8. In a machine of the class described, the combination with supporting means, of means for continuously supplying and feeding sheet material having spaced cut-out portions, a slide mounted on said supporting means, a cutter operatively connected to said slide for movement therewith and arranged when operated to cut the material, a reciprocating member connected to said cutter for operating it, power means, a dog connected to said slide and arranged to engage a wall of each cut-out portion and move said slide and cutter with the material, means operated by the slide for connecting said power means to said reciprocating member, means for releasing said dog from the material, and means for returning the slide and cutter to its first position.

9. In a machine of the class described, the combination with supporting means and means for continuously supplying and feeding material, of a reciprocating member, a die element and a cutting element operatively connected together for movement as a unit with the material and for movement of one relatively to the other, one of said elements being slidably mounted on said supporting means and the other element being slidably mounted on said reciprocating member and connected thereto for reciprocation therewith, power means, means connected with one of said elements and operated by the movement thereof in one direction to connect said power means to said reciprocating member, and means connected to one of said elements arranged to be operated by the moving material to move said elements with the material, means disposed in the path of movement of the last mentioned means for disconnecting said means from the material, and means for returning said elements to starting position.

10. In a machine of the class described, the combination with supporting means and means for supplying and feeding sheet material, of a mechanism for partially cutting the material, a separate mechanism for cutting another portion of the material, a device operatively connected to each said mechanism and normally biased into position to engage a wall of each partially cut portion of the material and arranged to be moved by the latter to control the operation of the adjacent cutting mechanism, and means for releasing each device from engagement with the material.

11. In a machine of the class described, the combination with supporting means and means for supplying and feeding sheet material, of a mechanism for partially cutting the material and a separate mechanism for cutting another portion of the material, each said mechanism consisting of a slide mounted on said supporting means, a cutter operatively connected to said slide for movement therewith and arranged when operated to cut the material, a reciprocating member connected to said cutter for operating it, power means, a dog connected to said slide and arranged to engage a wall of each cut portion of the material to connect the slide and cutter thereto, whereby the cutter moves with the material, means operated by the slide for connecting said power means to said reciprocating member, means for releasing the dog from the material, and means for returning the slide and cutter to their first position.

12. In a machine of the class described, the combination with supporting means and means for supplying and feeding sheet material, of a mechanism for partially cutting the material and a separate mechanism for cutting another portion of the material, each said mechanism consisting of a slide mounted on said supporting means, a cutter operatively connected to said slide for movement therewith and arranged when operated to cut the material, a reciprocating member connected to said cutter for operating it, power means, a dog connected to said slide and arranged to engage a wall of each cut portion of the material to connect the slide and cutter thereto, whereby the cutter moves with the material, means operated by the slide for connecting said power means to said reciprocating member, means for releasing the dog from the material, and means for returning the slide and cutter to their first position, the cutter for said separate mechanism being arranged to project into each cut and sever the remaining portion of the material.

13. A machine as claimed in claim 8 wherein said slide is provided with a die consisting of separable members and a cam operated by said reciprocating member and arranged to engage and operate one of said members to clamp the material therebetween.

14. An apparatus as claimed in claim 6 wherein is provided a mechanism controlled by the material for severing it into lengths.

CARL M. YODER.